United States Patent
Keskinen et al.

(10) Patent No.: US 11,286,008 B2
(45) Date of Patent: Mar. 29, 2022

(54) SUPPORT ARM FOR A LOAD BUNK OF A VEHICLE

(71) Applicant: Deere & Company, Moline, IL (US)

(72) Inventors: Juho M. Keskinen, Tampere (FI); Turo Oinonen, Kangasala (FI); Matti Karhunsaari, Lempäälä (FI); Perttu Auvinen, Tampere (FI)

(73) Assignee: Deere & Company, Moline, IL (US)

( * ) Notice: Subject to any disclaimer, the term of this patent is extended or adjusted under 35 U.S.C. 154(b) by 273 days.

(21) Appl. No.: 16/746,499

(22) Filed: Jan. 17, 2020

(65) Prior Publication Data
US 2020/0247482 A1 Aug. 6, 2020

(30) Foreign Application Priority Data
Feb. 5, 2019 (EP) .................................. 19155521

(51) Int. Cl.
  *B60P 3/41* (2006.01)
  *B62D 33/02* (2006.01)
(52) U.S. Cl.
  CPC ............ *B62D 33/0215* (2013.01); *B60P 3/41* (2013.01)
(58) Field of Classification Search
  CPC ...... B60P 3/41; B60P 3/40; B60P 7/12; B62D 33/0215; B62D 33/0207
  USPC ........................................ 410/37, 36, 32, 42
  See application file for complete search history.

(56) References Cited

U.S. PATENT DOCUMENTS

| 5,611,286 | A | 3/1997 | Liermann | |
|---|---|---|---|---|
| 6,468,008 | B2 * | 10/2002 | French | B62D 33/0215 410/37 |
| 7,794,188 | B2 * | 9/2010 | Whitehead | B65D 61/00 410/37 |
| 2002/0150438 | A1 * | 10/2002 | Coray | B60P 3/41 410/37 |

FOREIGN PATENT DOCUMENTS

| DE | 2262094 A1 | 6/1974 |
|---|---|---|
| DE | 7442137 U | 6/1975 |
| EP | 2028084 A2 | 2/2009 |

OTHER PUBLICATIONS

Search report issued in counterpart application No. EP19155521.8, dated Aug. 14, 2019 (7 pages).

* cited by examiner

*Primary Examiner* — Stephen T Gordon

(57) ABSTRACT

A support arm for a loading bunk of a transport vehicle, having a horizontal and a vertical section, each section comprising an inner and outer segment, which are telescopically connected to each other so that the length of the vertical and horizontal sections is variable. Each section further comprising an inner hydraulic actuator with at least one hydraulic pressure chamber, connected to the segments of the horizontal and vertical sections so that movement of the hydraulic actuators changes the lengths of the vertical and horizontal sections respectively. The vertical section being fixedly connected to the horizontal section on one end of the inner or outer segment.

8 Claims, 6 Drawing Sheets

SUPPORT ARM FOR A LOAD BUNK OF A VEHICLE

FIELD OF THE DISCLOSURE

The present disclosure generally relates to support arms, and more particularly to a support arm for a load bunk of a vehicle for transporting goods.

BACKGROUND OF THE DISCLOSURE

In order to transport goods, the vehicles used are often supplied with a load bunk, where especially bulk goods can be stored safely for transport. A typical example is a vehicle for transporting logs such as trucks or forwarder forestry vehicles. Such a load bunk usually comprises support arms, which surround the load bunk and create a load space where the logs are stored or placed for transport.

A common need is to adapt the load bunk to different log sizes and thus different space requirements of load space. In addition, there is a requirement to adapt the load bunk to a changing number of logs.

It is therefore common to provide the support arms of the load bunk with extendable support arms so that the size of the load space is adaptable. Yet, current solutions require adjustments of the load bunk before any logs are placed inside the load space. The extendable support arms must undergo a sliding movement, so that dirt and wear of the parts further hinders a convenient and easy use of the support arms for personal during the manual adjustment of the support arms. Further, current solutions provided with hydraulically adjustable support arms are fixed to their position if the main power source fails.

SUMMARY OF THE DISCLOSURE

In one embodiment, a support arm for a loading bunk of a vehicle is disclosed. The loading bunk has a horizontal and a vertical section, wherein each section comprises an inner and outer segment, which are telescopically connected to each other, so that the length of the vertical and horizontal sections is variable. Each section further comprises an inner hydraulic actuator with at least one hydraulic pressure chamber, which is connected to the segments of the horizontal and vertical sections, so that movement of the hydraulic actuators changes the lengths of the vertical and horizontal sections respectively. The vertical section is fixedly connected to the horizontal section on one end of the inner or outer segment, with one end of the hydraulic actuators being fixed in the connected segments of the vertical and horizontal sections. A hydraulic line connects the hydraulic pressure chamber of the horizontal and vertical hydraulic actuator, so that the hydraulic line remains in a fixed position in the connected segments, when the horizontal and/or the vertical hydraulic actuator is actuated. The support arm can be extended without relative movement of the hydraulic line for the hydraulic actuator. As hydraulic lines are subject to high pressures and a wide temperature range the avoidance of additional wear and tear on the outside surface increases the lifetime and reduces maintenance intervals.

In another embodiment the support arm retracts the vertical hydraulic actuator when the hydraulic pressure chamber is under hydraulic pressure and flow. The arrangement of the hydraulic actuator acting in the retracting direction ensures that in case of a hydraulic power loss the vertical section will not retract any further and support a safe state until the load space has been emptied and maintenance is possible.

In a further embodiment the vertical section is preloaded by a spring in the extending direction. The hydraulic actuator will extend in the event of a hydraulic power loss. This ensures maximal load capacity and the operation can continue even in the event of a failure of the hydraulic actuator. Additionally, any load already inside the load space can be safely kept in a state.

In another embodiment the spring is inside the hydraulic actuator. The spring can be kept away from outside influences such as coming in touch with the loading good or weather elements, so that accidental damage to the spring is prevented which further increases the safety margin in case of a hydraulic power loss.

In a further embodiment the spring is preloading the segments against each other. The spring can thus act on the segments and extend these even if the hydraulic actuator comes loose or breaks away. This further increases the safety margin of the support arms in case of hydraulic power loss.

In another embodiment a loading bunk of a vehicle is disclosed. The loading bunk has at least one support arm, which comprises a horizontal and a vertical section. Each section comprises an inner and outer segment, which are telescopically connected to each other, so that the length of the vertical and horizontal sections is variable. Each section further comprises an inner hydraulic actuator with at least one hydraulic pressure chamber, connected to the segments of the horizontal and vertical sections, so that movement of the hydraulic actuators changes the lengths of the vertical and horizontal sections respectively, the vertical section being fixedly connected to the horizontal section on one end of the inner or outer segment, with one end of the hydraulic actuators being fixed in the connected segments of the vertical and horizontal sections. A hydraulic line connects the hydraulic pressure chamber of the horizontal and vertical hydraulic actuator, so that the hydraulic line remains in a fixed position in the connected segments, when the horizontal and/or the vertical hydraulic actuator is actuated. The loading bunk and the loading space can be extended without relative movement of the hydraulic line for the hydraulic actuator. As hydraulic lines are subject to high pressures and a wide temperature range the avoidance of additional wear and tear on the outside surface increases the lifetime and reduces maintenance intervals.

In another embodiment the load volume of the loading bunk is adaptable by actuating the vertical and/or horizontal hydraulic actuator. This enables the load space to be extended in the horizontal as well as in the vertical direction. This allows to use the loading bunk for a wide range of loading material such as log, which may have different diameters.

In another embodiment, a vehicle, adapted to transport logs, with a loading bunk having at least one support arm is disclosed. The support arm comprises a horizontal and a vertical section, each section comprising an inner and outer segment, which are telescopically connected to each other, so that the length of the vertical and horizontal sections is variable. Each section further comprises an inner hydraulic actuator with at least one hydraulic pressure chamber, connected to the segments of the horizontal and vertical sections, so that movement of the hydraulic actuators changes the lengths of the vertical and horizontal sections respectively. The vertical section being fixedly connected to the horizontal section on one end of the inner or outer segment, with one end of the hydraulic actuators being fixed in the connected segments of the vertical and horizontal sections. A hydraulic line connects the hydraulic pressure chamber of the horizontal and vertical hydraulic actuator, so that the hydraulic line remains in a fixed position in the connected segments, when the horizontal and/or the vertical hydraulic actuator is actuated. The loading bunk and the loading space can be extended without relative movement of the hydraulic line for the hydraulic actuator. As hydraulic lines are subject to high pressures and a wide temperature range the avoidance of additional wear and tear on the outside surface increases the lifetime and reduces maintenance intervals. The vehicle can be used with varying size of the transporting good or with a varying amount.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

As used herein, unless otherwise limited or modified, lists with elements that are separated by conjunctive terms (e.g., "and") and that are also preceded by the phrase "at least one of" or "one or more of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

DETAILED DESCRIPTION

Figure 1:
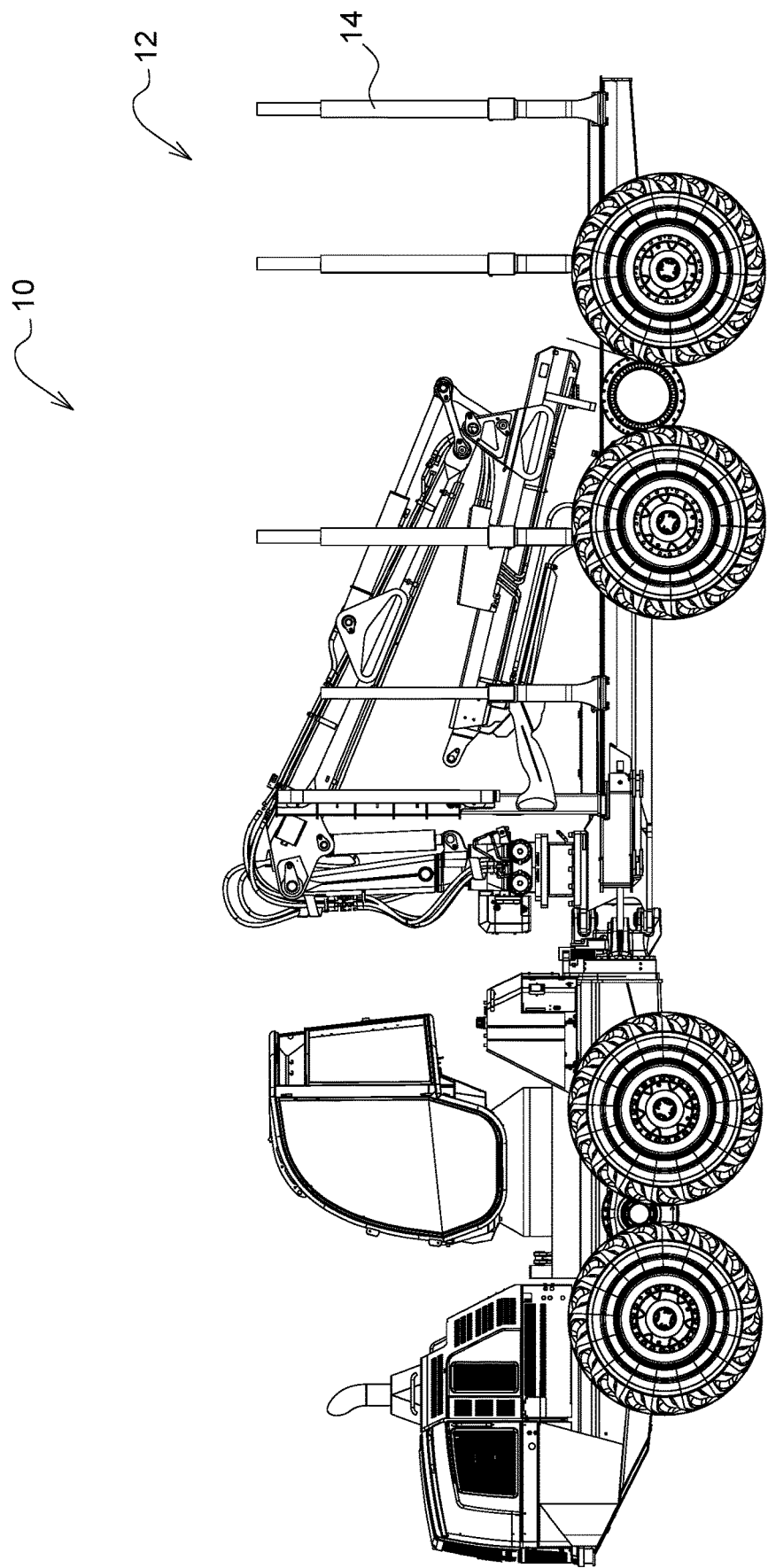
FIG. 1 is a side view of a forestry vehicle with a loading bunk.

FIG. 1 describes a forestry vehicle 10 with a loading bunk 12. The forestry vehicle 10 is depicted as a forwarder, used to transport logs. A front part of the vehicle 10 comprises an operator cabin and a power source (e.g., a combustion engine). A rear part of the vehicle 10 is connected to the front part by a joint and comprises the load bunk 12. The vehicle 10 as shown has a double bogie axle on the front and on the rear part. It may also have more or less wheels for each bogie or have more bogies overall.

The rear part the vehicle 10 comprises a crane to lift and load or unload logs into or from the loading bunk 12. In a further variant, the crane may also be mounted on the front part of the vehicle 10. The loading bunk 12 extends in the longitudinal direction of the vehicle or in the front back direction. Support arms 14 are provided and are positioned at the left and right side of the loading bunk 12 in the longitudinal direction of the vehicle 10. The support arms 14 enclose the loading bunk 12 and secure the logs from falling off the vehicle 10. The power source usually is providing power to a hydraulic pump which in turn is used to power hydraulic circuits with which the crane and the wheel motors and various other hydraulic applications are driven. The number of support arms 14 may vary. Usually these are paired and a left and right support arm 14 are mounted to a frame, which is enclosing the load bunk 12 on a bottom side.

Figure 2:
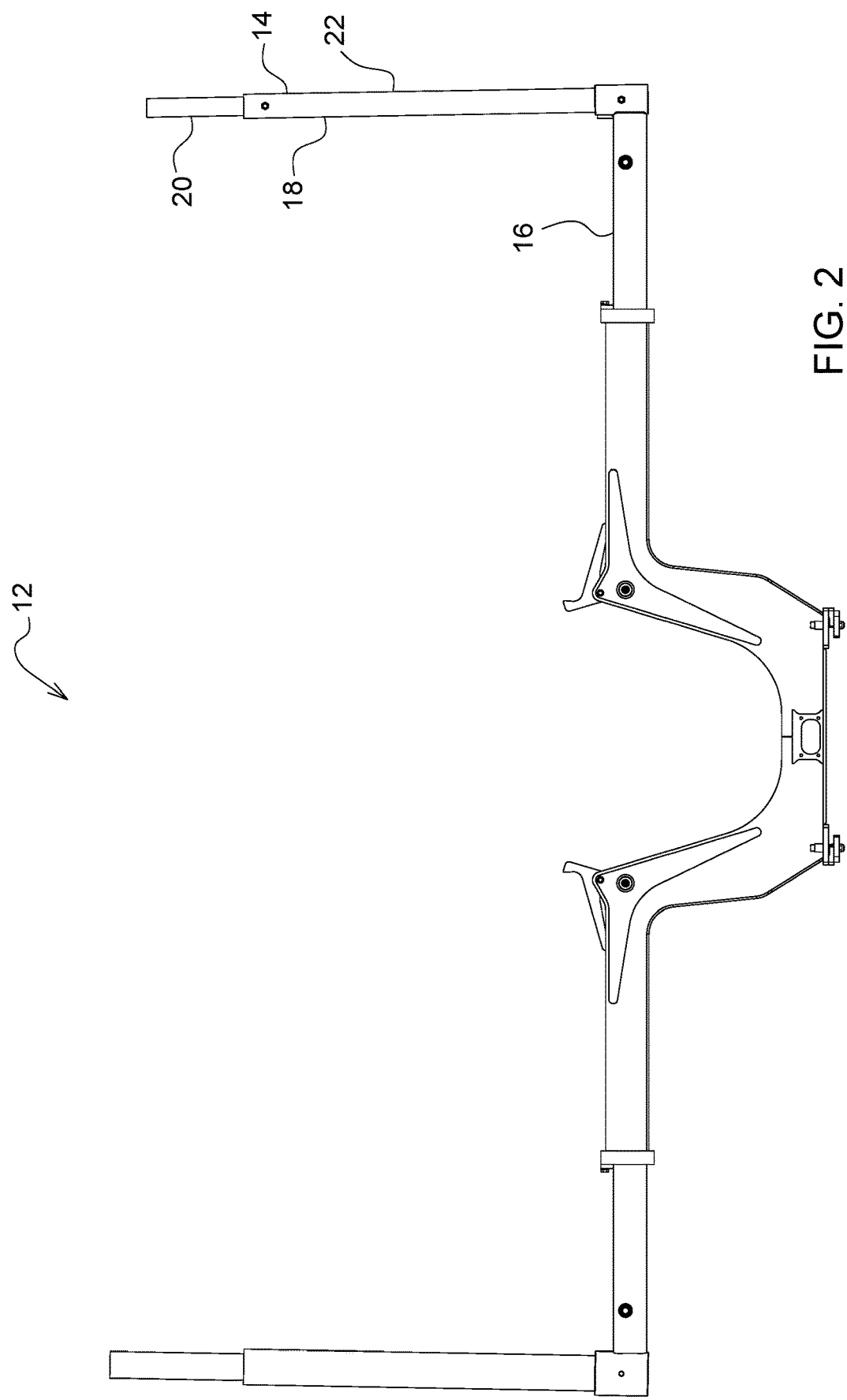
FIG. 2 is a front view of a part of the loading bunk.

FIG. 2 depicts a view in the left-right direction of a vehicle 10 of the load bunk 12. The support arms 14 are mounted to a frame part in the center area of the load bunk 12. A support arm 14 usually comprises a horizontal 16 and vertical section 18. The vertical section 18 is normally mounted at an end of the horizontal section 16. Each section can have an inner and an outer segment 20, 22. The inner segment 20 is held in a movable state inside the outer segment 22, so that the inner segment 20 can be moved and held in place in relation to the outer segment 22. The inner segment 20 enables the extension of the support arm 14 to a decided length and can be held in that manner either by hydraulic force or by mechanical force.

In FIG. 2 it is shown how the support arms 14 are connected with a center part to form the loading bunk 12. The loading bunk 12 and the support arms 14 are extendable in the horizontal as well as in the vertical direction by relative movement of the inner segments 20 in relation to the outer segments 22 in both the horizontal and the vertical sections 16, 18. The loading bunk 12 can therefore be adapted in the horizontal and vertical direction depending on the log diameter, the log quantity, the log quality or other sorting adjectives. A plurality of the construction shown in FIG. 2 can be arranged on the chassis of the vehicle 10 to build the load space and the loading bunk 12. The center part can be level with the horizontal sections 16 of the support arms 14 or, as shown, have a lowered center part to further expand the loading volume.

Figure 3:
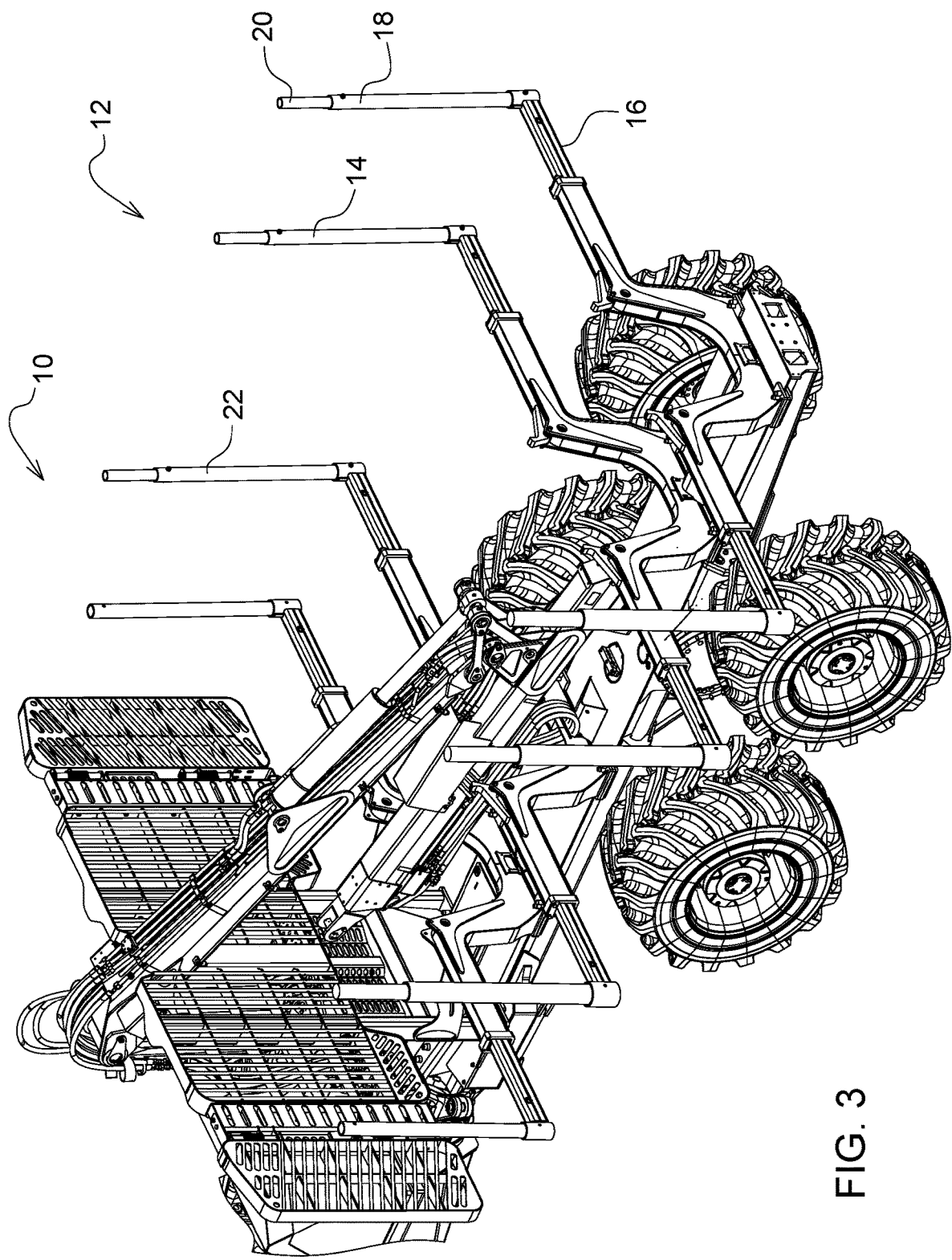
FIG. 3 is a perspective view showing a rear portion of the forestry vehicle having the loading bunk.

FIG. 3 depicts a setup of the loading bunk 12. It comprises multiple instances of support arms 14 on the left and right side of the loading bunk 12 connected to a center part and being further connected to the chassis of the vehicle 10. The vertical sections 18 of the support arms 14 constitute an outer end of the loading bunk 12. If the load space is insufficient, the operator may extend the vertical and/or horizontal sections 16, 18.

Figure 4:
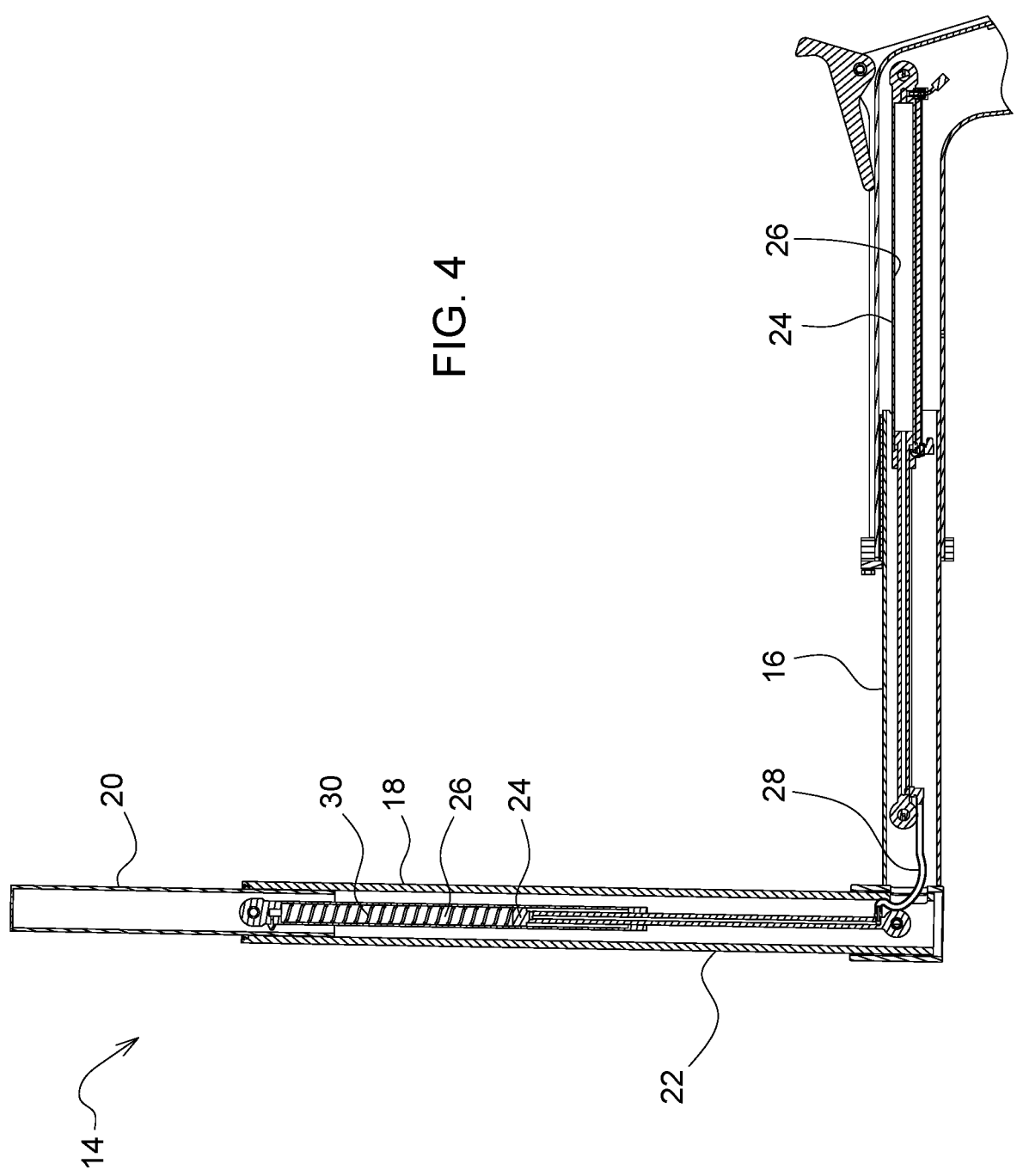
FIG. 4 is a side cutaway view of one embodiment of the support arms.

FIG. 4 depicts a setup of a support arm 14. The horizontal section 16 is directly connected to the center part with its outer segment 22. The inner segment 20 is inserted slidably into the outer segment 22, so that a relative sliding movement of the inner segment 20 extends or reduces the length of the horizontal section 16 of the support arm 14. The inner and outer segments 20, 22 may have an end stop, so that the inner and outer segments are held at a final position where further extension is no longer possible.

A hydraulic actuator 24 is fixed to the inner segment 20 of the horizontal section 16 and to the center part of the loading bunk 12, so that when the hydraulic actuator 24 is extended the inner segment 20 is pushed outwards of the outer segment 22 and the horizontal section 16 is extended. The hydraulic actuator 24 in the horizontal section 16 can be a single or double acting hydraulic actuator.

One end of the inner segment 20 of the horizontal section 16 is connected to the outer segment 22 of the vertical section 18. The vertical section 18 further comprises an inner segment 20 which is slidably held inside the outer segment 22. Inside the vertical section 18 may also be provided a hydraulic actuator 24, which is fixed with one end to the inner segment 20 and with the other end to the outer segment 22 of the vertical section 18. A spring 30 is provided inside the hydraulic actuator 24 so that when the hydraulic actuator 24 has no hydraulic pressure the hydraulic actuator 24 is extended by the spring force as well as the vertical section 18. In case of a hydraulic failure the vertical section 18 will thus be extended by mechanical spring force to ensure safety and keeping the loaded logs securely inside the loading bunk 12. In the embodiment of FIG. 4, the cylinder space as the hydraulic pressure chamber 26 of the hydraulic actuator 24 comprises the spring and the rod side of the hydraulic actuator acts against the spring force.

Between the horizontal and vertical sections, a hydraulic line 28 is connected, so that the cylinder space of the hydraulic actuator 24 of the horizontal section 16 is hydraulically connected to the rod space of the hydraulic actuator 24 of the vertical section 18. Further a separate hydraulic connection is provided to the rod space of the hydraulic actuator of the horizontal section 16.

When the horizontal section 16 is actuated and/or the vertical section 18 is actuated, the hydraulic line connection undergoes no relative movement. The hydraulic connection can be securely fixed inside the sections 16, 18 and the hydraulic flow is kept at the same level. Further, any wear may be omitted. Also, actuation of the horizontal and vertical sections can be separated.

Figure 5:
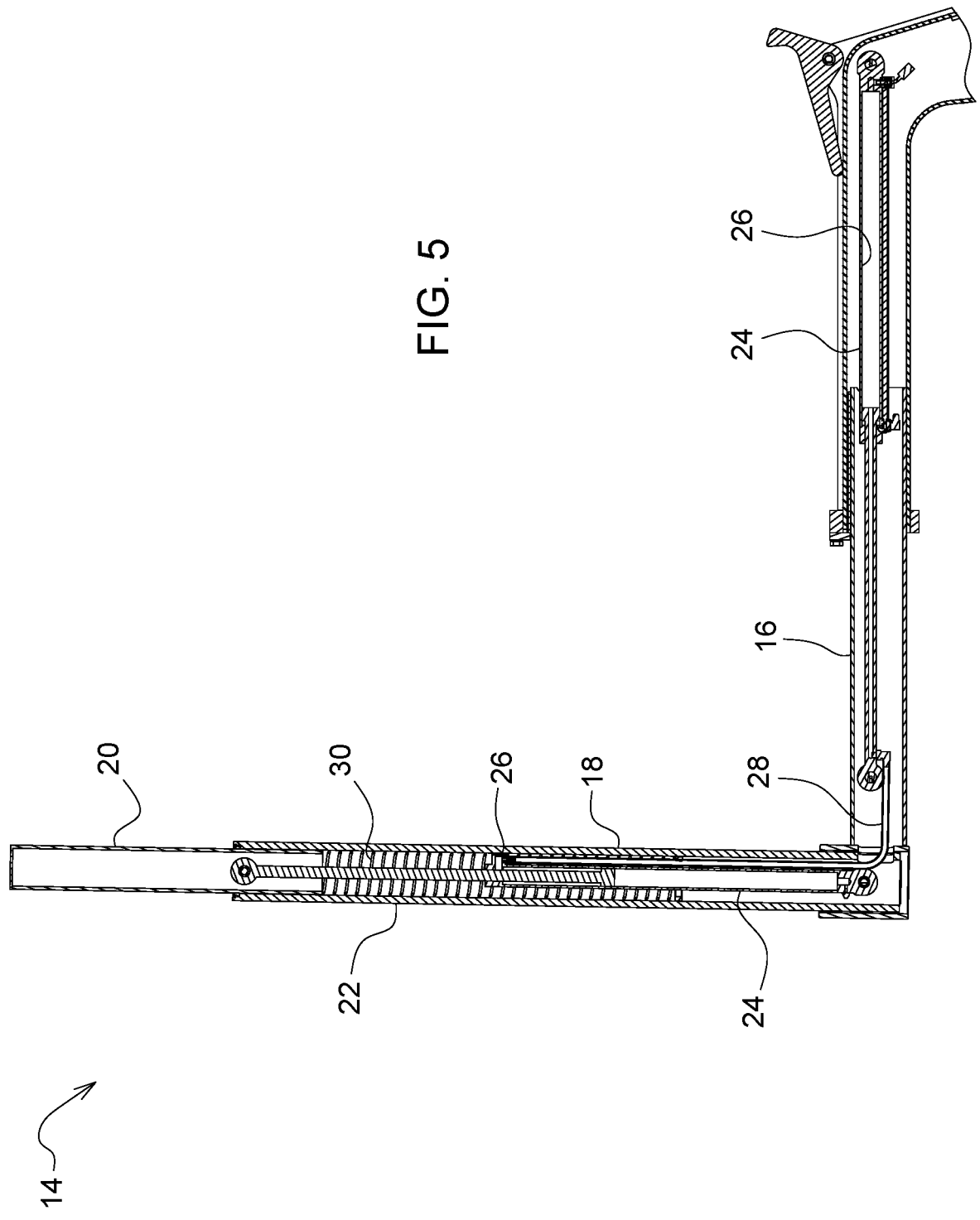
FIG. 5 is a side cutaway view of another embodiment of the support arms.

FIG. 5 shows a different setup of the spring in the vertical section 18 and the hydraulic actuator. The setup of the horizontal section 16 corresponds to that of FIG. 4. The spring is provided on the outside of the hydraulic actuator 24 and is preloading the inner segment 20 against the outer segment 22. In consequence the rod space of the hydraulic actuator 24 is acting against the spring force and retracts the inner segment 20 into the outer segment 22 of the vertical section 18. When no hydraulic pressure is applied, the hydraulic actuator 24 will be extended by the spring force. Due to the different arrangement of the spring 30, the hydraulic line 28 is extended to be connected to the rod space of the hydraulic actuator 24. In this setup the hydraulic line 28 is also safely placed avoiding any movement during the actuation.

Figure 6:
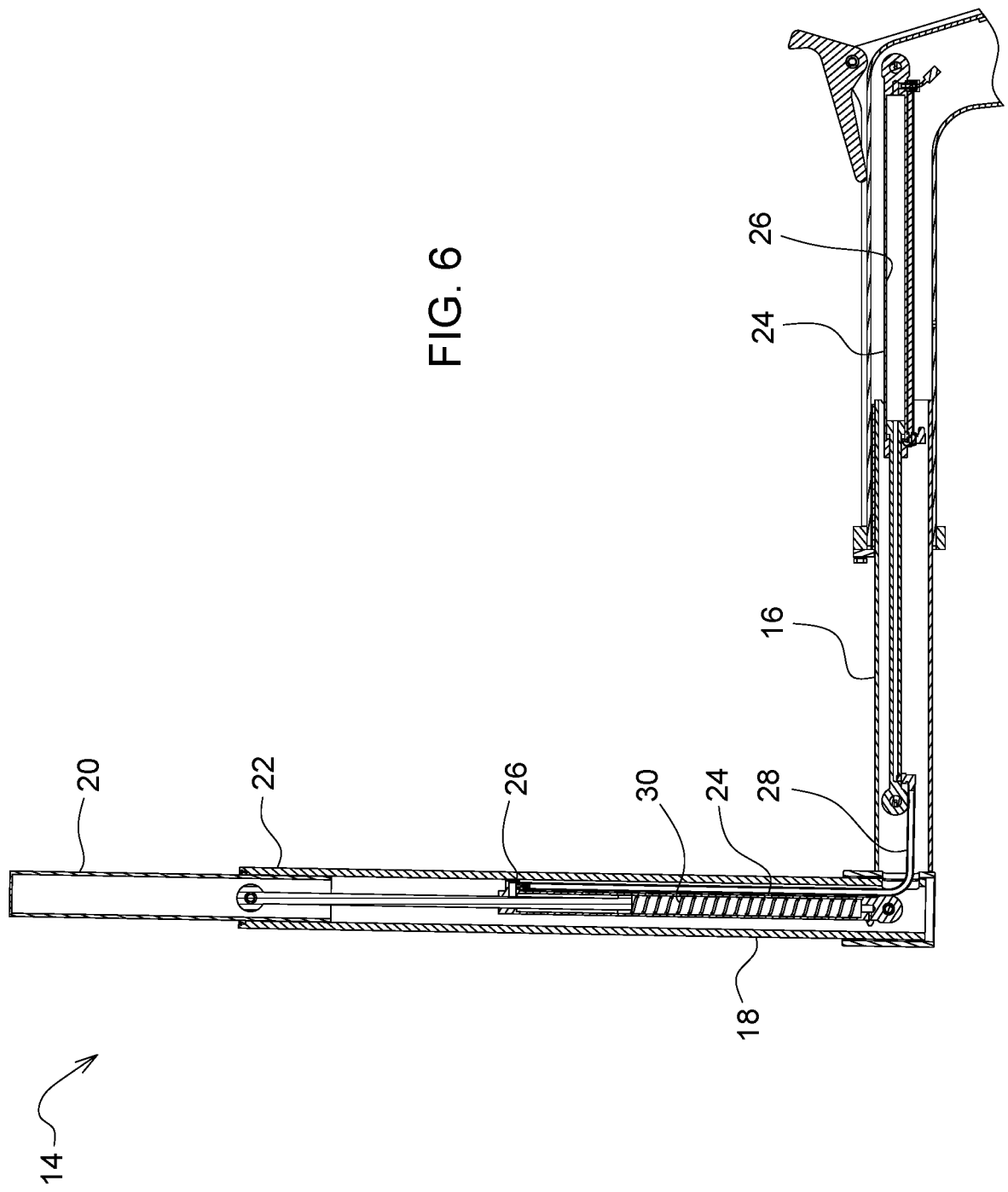
FIG. 6 is a side cutaway view of yet another embodiment of the support arms.

In FIG. 6 the hydraulic actuator 24 of the vertical section 18 is oriented in the opposite way of FIG. 4. The cylinder end of the hydraulic actuator 24 in the vertical section 18 is connected and provided in the outer segment 22 while the rod end is provided and connected to the inner segment 20. A hydraulic line 28 is connected to the rod space being the hydraulic pressure chamber 26. The cylinder chamber of the actuator houses a spring 24 which acts against the hydraulic pressure chamber 26. The hydraulic line 28 connected to the hydraulic actuator 24 of the vertical section 18 is fixed inside the support arm 14 and remains fixedly in place so that the movement of the support arm 14 is having no effect on the hydraulic connection and wear may be omitted.

What is claimed is:

1. A support arm for a loading bunk of a vehicle, the support arm comprising:
   a horizontal and a vertical section, each section comprising:
      an inner and outer segment, which are telescopically coupled to each other so that the length of the vertical and horizontal sections is variable;
      an inner hydraulic actuator with at least one hydraulic pressure chamber, connected to the segments of the horizontal and vertical sections, so that movement of the hydraulic actuators changes the lengths of the vertical and horizontal sections respectively, the vertical section being fixedly connected to the horizontal section on one end of the horizontal section inner or outer segment, with one end of the hydraulic actuators being fixed in the coupled segments of the vertical and horizontal sections; and
   a hydraulic line connecting the hydraulic pressure chamber of the horizontal and vertical section hydraulic actuator, so that the hydraulic line remains in a fixed position in the coupled segments, when the horizontal or the vertical section hydraulic actuator is actuated.

2. The support arm of claim 1, wherein the vertical section hydraulic actuator retracts when the hydraulic pressure chamber is under hydraulic pressure and flow.

3. The support arm of claim 1, wherein the vertical section is preloaded by a spring in an extending direction.

4. The support arm of claim 3, wherein the spring is inside the hydraulic actuator.

5. The support arm of claim 3, wherein the spring is preloading the segments against each other.

6. A loading bunk of a vehicle, having at least one support arm, the support arm comprising:
   a horizontal and a vertical section, each section comprising:
      an inner and outer segment, which are telescopically connected to each other so that the length of the vertical and horizontal sections is variable;
      each section further comprising an inner hydraulic actuator with at least one hydraulic pressure chamber, connected to the segments of the horizontal and vertical sections, so that movement of the hydraulic actuators changes the lengths of the vertical and horizontal sections respectively, the vertical section being fixedly connected to the horizontal section on one end of the horizontal section inner or outer segment, with one end of the hydraulic actuators being fixed in the connected segments of the vertical and horizontal sections; and
   a hydraulic line connecting the hydraulic pressure chamber of the horizontal and vertical section hydraulic actuator, so that the hydraulic line remains in a fixed position in the connected segments, when the horizontal or the vertical section hydraulic actuator is actuated.

7. The loading bunk of claim 6, wherein the load volume of the loading bunk is adaptable by actuating the vertical or horizontal hydraulic actuator.

8. A vehicle adapted to transport logs, the vehicle comprising:
   a loading bunk having at least one support arm comprising a horizontal and a vertical section, each section comprising:
      an inner and outer segment, which are telescopically connected to each other so that the length of the vertical and horizontal sections is variable;
      each section further comprising an inner hydraulic actuator with at least one hydraulic pressure chamber, connected to the segments of the horizontal and vertical sections, so that movement of the hydraulic actuators changes the lengths of the vertical and horizontal sections respectively, the vertical section being fixedly connected to the horizontal section on one end of the horizontal section inner or outer segment, with one end of the hydraulic actuators being fixed in the connected segments of the vertical and horizontal sections; and a hydraulic line connecting the hydraulic pressure chamber of the horizontal and vertical section hydraulic actuator, so that the hydraulic line remains in a fixed position in the connected segments, when the horizontal and/or the vertical section hydraulic actuator is actuated.

* * * * *